US005958622A

United States Patent [19]

Kojima et al.

[11] Patent Number: 5,958,622

[45] Date of Patent: Sep. 28, 1999

[54] NEGATIVE ELECTRODE MATERIAL FOR LITHIUM SECONDARY BATTERIES

[75] Inventors: Yoshitsugu Kojima; Akihiko Koiwai; Nobuaki Suzuki; Satoru Yamamoto, all of Aichi, Japan

[73] Assignee: Kabushiki Kaisha Toyota Chuo Kenkyusho, Aichi-ken, Japan

[21] Appl. No.: 08/824,294

[22] Filed: Mar. 26, 1997

[30] Foreign Application Priority Data

| | | | |
|---|---|---|---|
| Mar. 28, 1996 | [JP] | Japan | 8-103605 |
| Sep. 10, 1996 | [JP] | Japan | 8-262503 |
| Dec. 27, 1996 | [JP] | Japan | 8-358568 |
| Jan. 23, 1997 | [JP] | Japan | 9-026035 |

[51] Int. Cl.[6] ...... H01M 4/58

[52] U.S. Cl. ...... 429/218.1; 423/445 R

[58] Field of Search ...... 429/218.1; 423/445 R

[56] References Cited

U.S. PATENT DOCUMENTS

| | | | |
|---|---|---|---|
| 4,668,595 | 5/1987 | Yoshino et al. | 429/194 |
| 5,069,683 | 12/1991 | Fong et al. | 29/623.1 |
| 5,451,477 | 9/1995 | Omaru et al. | 429/218.1 |

FOREIGN PATENT DOCUMENTS

| | | |
|---|---|---|
| 0 652 602 | 5/1995 | European Pat. Off. . |
| 1-221859 | 9/1989 | Japan . |
| 6-84515 | 3/1994 | Japan . |
| 7-326343 | 12/1995 | Japan . |
| 8-102324 | 4/1996 | Japan . |

*Primary Examiner*—Maria Nuzzolillo
*Assistant Examiner*—Laura Weiner
*Attorney, Agent, or Firm*—Oblon, Spivak, McClelland, Maier & Neustadt, P.C.

[57] ABSTRACT

A negative electrode material capable of absorbing and desorbing lithium is comprised of a mixture of coke and graphite. The amount of graphite in the mixture is near to that which induces percolation transition. Preferably, the amount of graphite in the mixture is 2 to 37 wt % relative to the total amount of the coke and graphite. The coke may be prepared by heating raw coke from oil or coal at 500 to 900° C. The coke may be 0.06 or more in the atomic ratio of hydrogen to carbon and 0.003 or more in the atomic ratio of oxygen to carbon. The graphite may be 0.5 $\mu$m to 30 $\mu$m in a mean particle size. Lithium secondary batteries comprising the negative electrodes have a large discharge capacity.

10 Claims, 5 Drawing Sheets

(MEANS PARTICLE SIZE 1μm)

(MEANS PARTICLE SIZE 13μm)

NEGATIVE ELECTRODE MATERIAL FOR LITHIUM SECONDARY BATTERIES

FIELD OF THE INVENTION

The present invention relates to a negative electrode material for lithium secondary batteries, which consists essentially of coke.

BACKGROUND OF THE INVENTION

Recently, small-sized, cordless electronic appliances such as pocket telephones are being increasingly popularized. In addition, further development and popularization of electric cars is desired in view of environmental problems and energy problems. With these, secondary batteries having a high energy density are required.

Heretofore as good secondary batteries, known are nickel-cadmium batteries, nickel-hydrogen batteries, and lead-acid batteries. However, with the energy density these heavy batteries are not promising candidates.

On the contrary, since lithium secondary batteries comprise a light and easily-handlable lithium metal, their energy density is high, and therefore, they are expected to be applicable to high-performance pocket telephones and electric cars.

However, in lithium secondary batteries where a lithium metal is used in the negative electrode, the lithium metal is deposited as dendrite or powdery active metal on the surface of the negative electrode during charging a battery. In this case, the dendrite of a lithium metal often penetrates through a separator, and sometimes short-circuit the battery by electrically contacting with a positive electrode, or even reacts with the electrolytic solution, resulting in lowering the charge/discharge capacity of the lithium secondary batteries.

In order to evade these troubles, graphite is used as the negative electrode active material for lithium secondary batteries, so that graphite capable of being intercalated with lithium ions during charging could prevent the deposition of such dendritic lithium and the reaction of lithium with electrolytic solutions.

However, graphite is still problematic in that it has poor stickiness to a current collector through which generated electricity is taken out, therefore causing the deterioration of electrodes.

Japanese Patent Application Laid-Open No. 6-84515 discloses a negative electrode comprising graphite and, as a binder, from 40 to 60% by weight of coke, said coke being added to graphite in order to improve the stickiness of graphite to collectors.

Though having improved its stickiness, the electrode disclosed therein is still problematic in that it is often insufficiently charged due to voltage drop during high-rate charging operation.

On the other hand, coke itself can be used as a negative electrode, as disclosed in Japanese Patent Application Laid-Open No. 1-221859. Coke is advantageous in not only having much absorption capacity of lithium but also being inexpensive.

Coke as referred to in said laid-open specification is a gray-black porous solid obtained through high-temperature dry distillation (at 1200 to 1400° C.) of oil or coal.

Japanese Patent Application Laid-Open No. 8-102324 discloses the powdered coke having heated at from 400° C. to 700° C. is calcinated in an inert gas atmosphere at from 900° C. to 1500° C., and applied to a negative electrode material.

However, the negative electrodes comprising any of such cokes are still problematic in the following points.

Since the negative electrodes comprising any of such cokes have poor electroconductivity and since the coke crystals constituting said cokes are large, the amount of lithium ions capable of being actually absorbed by the negative electrodes is still smaller than the theoretical capacity of graphite. Therefore, when said cokes are used, it is impossible to obtain lithium secondary batteries having a large charge/discharge capacity.

The theoretical capacity as referred to hereinabove is the capacity of a secondary battery in which it is presumed that the negative electrode active material is made of graphite that is the ultimate structure of carbon. In this, therefore, lithium ions are absorbed by the negative electrode active material through intercalation (in the first stage) of said lithium ions into the layers constituting the layer structure of said graphite. In this case, the graphite shall absorb one lithium ions per six carbon atoms. Accordingly, the theoretical capacity (that is, the charge/discharge capacity per gram of the negative electrode active material) is to be 372 $mAhg^{-1}$.

On the other hand, (1) Japanese Patent Application Laid-Open No. 7-192724 discloses the use of a combination of a non-graphite carbon material and graphite; (2) Japanese Patent Application Laid-Open No. 7-147158 discloses the use of a graphite material containing from 1 to 30% by weight of pseudo-graphitic carbon black; and (3) Japanese Patent Application Laid-Open No. 7-326343 discloses the use of a carbon material combining high-crystalline graphite with low-crystalline carbon by melting.

It is known that these are effective in some degree for improving the capacity of negative electrodes for lithium secondary batteries.

However, the carbon material in (3) is still defined as crystallized carbon material rather than a mixture of graphite and coke; the amount of graphite in the material in (2) is larger than that inducing percolation transition; and the amount of graphite in the combination in (1) is not specifically defined to fall within the range that may induce percolation transition, and the amount of graphite and that of coke in the combination in (1) are not optimized. Thus, all these techniques disclosed are not still satisfactory in the point of increasing the capacity of negative electrodes for lithium secondary batteries.

The theoretical capacity as referred to hereinabove is the capacity of a secondary battery in which it is presumed that the negative electrode active material is made of graphite that is the ultimate structure of carbon. In this, therefore, lithium ions are absorbed by the negative electrode active material through intercalation (in the first stage) of said lithium ions into the layers constituting the layer structure of said graphite. In this case, the graphite shall absorb one lithium ions per six carbon atoms. Accordingly, the theoretical capacity (that is, the charge/discharge capacity per gram of the negative electrode active material) is to be 372 $mAhg^{-1}$.

In consideration of these problems, the present invention is to provide a negative electrode material for lithium secondary batteries, with which it is possible to obtain lithium secondary batteries having a large discharge capacity.

SUMMARY OF THE INVENTION

The present invention provides a negative electrode material for lithium secondary batteries, which comprises: coke;

and graphite forming a mixture with said coke, an amount of said graphite (Cg) being near to an amount which induces percolation transition (Cp).

The amount of graphite (Cg) preferably ranges from 2 to 40% by weight. If, however, the Cg deviates this range, the negative electrode active material is inferior in charge/discharge capacity and electroconductivity.

The proportion in percentage of graphite as referred to herein indicates the value in % by weight of graphite in the negative electrode active material relative to the total weight of graphite and coke in the active material.

The amount of graphite (Cg) being near to the amount that induces percolation transition (Cp), as referred to herein, means that the proportion in percentage of graphite added (Cg) preferably falls between −10% and +10% of that of graphite to be added to reach the percolation transition point thereof (Cp), or that is, $(Cp-10) \leqq Cg \leqq (Cp+10)$.

If satisfying the above-mentioned requirements, it is possible to obtain a negative electrode material for lithium secondary batteries, with which lithium secondary batteries may have a large discharge capacity.

If, however, Cg is less than (Cp−10), the electroconductivity of the negative electrode active material including coke can not be improved satisfactorily, resulting in that the negative electrode comprising the material can not discharge efficiently. On the other hand, if Cg is larger than (Cp+10), the amount of the graphite existing in the negative electrode active material is too much so that the characteristics of the negative electrode will be intrinsic to single graphite substance, i.e. the rates of the intercalation and the deintercalation of lithium ions are too low to catch up with a high current density such as 0.5 $mA/cm^2$ or higher. This decreases discharge characteristics of the negative electrode.

In particular, when $Cg \ll Cp$, it is more difficult for the negative electrode material to be improved in electroconductivity and discharge capacity.

On the other hand, if $Cg \gg Cp$, the graphite is a dominant element to determine the characteristic of a negative electrode, inevitably resulting in noticeable lowering of the discharge capacity of the negative electrode in a high current density condition (for example, at 0.5 $mA/cm^2$ or higher).

The more preferred range of Cg is $(Cp-5) \leqq Cg \leqq (Cp+5)$.

The percolation transition occurred in the negative electrode active material for lithium secondary batteries of the present invention is explained as follows.

Where Cg is small, the negative electrode active material 1 comprises coke 10 and particles of graphite 11 as spotwise dispersed in coke 10, as in FIG. 1A. With the increase in Cg, the mean distance between the spotwise-dispersed graphite particles 11 is gradually decreased. At last, electroconductive paths 12 are formed between the graphite particles 11 in coke 10, as in FIG. 1B. On this point, the electric resistance value of the negative electrode active material 1 is greatly lowered. This phenomenon is referred to as percolation transition, and the point at which this phenomenon has occurred is referred to as a percolation transition point.

In the negative electrode active material being at said percolation transition point, the graphite particles and the electroconductive paths therebetween act as the network for electroconduction in said negative electrode active material, while increasing the discharge capacity of the coke existing in said negative electrode active material due to the collecting effect of said graphite.

Accordingly, if a lithium secondary battery is formed, using negative electrodes made from a negative electrode material for lithium secondary batteries that comprises a negative electrode active material with Cg near to Cp, it may have a high discharge capacity.

The negative electrode material-for lithium secondary batteries of the present invention comprises a negative electrode active material that comprises coke and graphite. In this, the graphite itself can also absorb lithium ions to act as the negative electrode active material. Therefore, as compared with a negative electrode made of coke only, the negative electrode comprising the negative electrode active material of the invention can have a higher discharge capacity.

Coke for use in the present invention is preferably a heat-treated one, which comprises coke crystals as in FIG. 2 which will be referred to in detail hereinunder. The coke crystals in such a heat-treated coke are larger than those in raw coke as a starting material. The terminals of the coke crystals in the present heat-treated coke are increased as compared with those in ordinary coke (produced, at from 1200° C. to 1400° C.). This makes a large number of cavities between the coke crystals of the present invention. The coke of the present invention is preferably heat-treated at less than 1200° C.

The coke crystals as referred to herein consist essentially of hydrocarbons and have a 6-membered planar network structure, while partly having a layered structure like crystalline graphite. The terminals of the coke crystals are in such a condition that hydrogen is bonded to carbon.

The coke crystals may absorb lithium ions in the space between the layers in their layered structure, as in crystalline graphite, and the thus-absorbed lithium ions are still ionic ones in the coke crystals.

In addition, the coke crystals may further absorb lithium ions even in the cavities formed between their terminals, while the thus-absorbed lithium ions form lithium clusters.

In that manner, therefore, the present heat-treated coke comprising such coke crystals can absorb larger amounts of lithium ions and lithium clusters.

In addition, since the coke crystals constituting the present heat-treated coke are much smaller than those in ordinary coke that has heretofore been used in the art, and since the number of coke crystals in the former is larger than that in the latter, the number and the volume of the cavities in the former are larger than those in the latter. Accordingly, the present heat-treated coke can absorb a much larger amount of lithium clusters than ordinary coke.

The lithium cluster as referred to herein indicates a mass of lithium ions as aggregated together due to their interaction.

The atomic ratio of hydrogen atoms to carbon atoms, H/C, in the present heat-treated coke is preferably 0.1 or more.

The increase in the atomic ratio H/C corresponds to the increase in the terminals of the coke crystals constituting the heat-treated coke, and the increase in the terminals of the coke crystals indicates the increase in the cavities formed between said terminals.

In the manner as mentioned hereinabove, since the number and the volume of the cavities, in which lithium clusters can be formed, are increased in the heat-treated coke, the present negative electrode active material comprising such heat-treated coke can absorb a larger amount of lithium ions. Accordingly, when the negative electrode active material of that type is used, it is possible to obtain lithium secondary batteries having a larger discharge capacity. However, if the atomic ratio H/C is less than 0.1, the number and the volume of the cavities are small so that the lithium secondary battery comprising such a negative electrode will have a small discharge capacity.

It is preferable that the uppermost limit of the atomic ratio H/C is 0.3.

If the atomic ratio H/C is larger than the uppermost limit, the irreversible capacity, or that is, the difference between the initial charge capacity and the discharge capacity of the battery will increase, thereby lowering the discharging efficiency of the battery.

Further preferably, the heat-treated coke has an electroconductivity of $10^{-7}$ $Scm^{-1}$ or larger.

If its electroconductivity is smaller than $10^{-7}$ $Scm^{-1}$, both the number and the volume of the cavities in the coke are small, resulting in a small discharge capacity of a negative electrode.

It is desirable that the uppermost limit of the electroconductivity of the coke is $10^{-2}$ $Scm^{-1}$.

If its electroconductivity is over the uppermost limit, H/C in the coke is not larger than 0.1, resulting in that both the number and the volume of the cavities therein will decrease.

It is also desirable that the atomic ratio of hydrogen atoms to carbon atoms, H/C, in the heat-treated coke for use in the present invention is 0.06 or more while the atomic ratio of oxygen atoms to carbon atoms, O/C, therein is 0.003 or more.

The increase in the atomic ratio H/C and that in the atomic ratio O/C correspond to the increase in the terminals of the coke crystals constituting the heat-treated coke, and the increase in the terminals of the coke crystals indicates the increase in the cavities formed between said terminals.

Since the number and the volume of the cavities, in which lithium clusters can be formed, are thus increased in the heat-treated coke, the negative electrode active material comprising such heat-treated coke can absorb a larger amount of lithium ions. Accordingly, when the negative electrode active material of that type is used, it is possible to obtain lithium secondary batteries having a larger charge/discharge capacity.

However, if the atomic ratio H/C is less than 0.06 while O/C is less than 0.003, the number and the volume of the cavities are small, and the lithium secondary batteries comprising negative electrodes that comprise the coke having such a small ratio H/C and a small ratio of O/C will have a small charge/discharge capacity.

It is preferable that the uppermost limit of the atomic ratio H/C is 0.3 and that the uppermost limit of O/C is 0.02.

If the atomic ratio H/C and the atomic ratio O/C are larger than their uppermost limits, the resistance of the heat-treated coke increases to have an electroconductivity of smaller than $10^{-7}$ $Scm^{-1}$, resulting in that a negative electrode made of the coke can not satisfactorily charge and discharge due to IR drops.

The heat-treated coke for use in the present invention is preferably one as obtained by heating raw coke at from 500° C. to 900° C., said raw coke being obtained through low-temperature dry distillation of oil or coal.

For example, to obtain the raw coke, petroleum heavy oil is subjected to dry distillation (heating in the absence of air) at a temperature of about 500° C. for a predetermined period of time to attain pyrolytic depolymerization of said oil. A crude oil coke for the present raw coke is, obtained along with oil gas and liquid fractions.

The raw coke is also obtained through dry distillation of coal at a temperature of about 500° C.

If the temperature for the heat treatment of the raw coke to give heat-treated coke is lower than 500° C., the irreversible capacity, or that is, the difference between the initial charge capacity and the discharge capacity of a negative electrode that comprise the heat-treated coke will increase, thereby lowering the discharging efficiency of the battery. In addition, the electroconductivity of the coke thus heat-treated at such low temperatures is small, thereby causing a phenomenon of such that the closed circuit voltage (terminal voltage) of the lithium secondary battery constituted by negative electrode of the heat-treated coke is lower than that of the open circuit voltage thereof due to IR drops in the electrodes, and resulting in that the battery could charge and discharge insufficiently. The IR drop referred to herein indicates the voltage drop in carbon electrodes when an electric current passes therethrough.

If, on the other hand, the temperature for the heat treatment of the raw coke is higher than 900° C., the atomic ratio of hydrogen atoms to carbon atoms, H/C, in the thus heat-treated coke is smaller than 0.1, resulting in that the amount of the lithium clusters to be formed in the cavities between the terminals of carbon crystals (FIG. 2 is referred to) during charging will be decreased.

The preferred period of time for the heat treatment is not specifically defined.

Desirably, however, the period of time for the heat treatment may fall between 30 minutes and 3 hours, because such a heat-treatment extremely improves discharge capacity of the coke.

The heat treatment is preferably conducted in an inert atmosphere.

The raw coke being heat treated in an inert atmosphere can be protected from being oxidized. This heat-treated coke comprises the coke crystals as illustrated in FIG. 2.

The inert atmosphere may be any of a vacuum atmosphere, or so called inert gas, such as $N^2$ and so on.

Also preferably, the coke of the present invention is the raw coke from oil or coal heat-treated at a temperature not higher than 850° C.

If the temperature of the heat treatment is higher than 850° C., the ratio H/C in the resulting heat-treated coke is smaller than 0.03 while the ratio O/C therein is smaller than 0.003, resulting in that the amount of the lithium clusters formed in the cavities between the terminals of carbon crystals (FIG. 2 is referred to) during charging will be decreased.

More preferably, the lowermost limit of the temperature for the heat treatment is 600° C., and the uppermost limit thereof is 800° C.

Now, graphite applied to the negative electrode of the present invention may be either natural graphite or artificial graphite. Since graphite having a smaller particle size may have a smaller Cp, it is desirable that graphite of the present invention has a mean particle size of from 0.5 $\mu$m to 30 $\mu$m, more preferably from 1 $\mu$m to 20 $\mu$m.

Graphite having a mean particle size of smaller than 0.5 $\mu$m has a large specific area. Therefore, if graphite having such a small mean particle size is used for a negative electrode, the irreversible capacity of the electrode will increase, thereby lowering the discharging efficiency of a battery.

On the other hand, if graphite having a mean particle size larger than 30 $\mu$m is used for preparing a negative electrode, large amount of the graphite should be added to the electrode to cause percolation transition in the active material of the electrode. This cause the capacity of a battery comprising the negative electrodes to be lowered due to voltage drop during charging and discharging in a high current density condition.

The negative electrode active material of the present invention is available with a collector and a binder.

For example, the negative electrode active material comprising coke and graphite in the manner as mentioned hereinabove is mixed with a binder, and shaped along with a collector to give a negative electrode for lithium secondary batteries.

BRIEF DESCRIPTION OF THE DRAWINGS

In FIGS. 1A, 1B and 2, 1 is a negative electrode material for lithium secondary batteries; 10 is coke; and 11 is a graphite particle.

EMBODIMENTS OF THE INVENTION

Embodiment 1

This is to demonstrate the negative electrode material for secondary lithium batteries of the invention and a method of preparing it, with reference to FIGS. 1A to 3.

Figure 5:
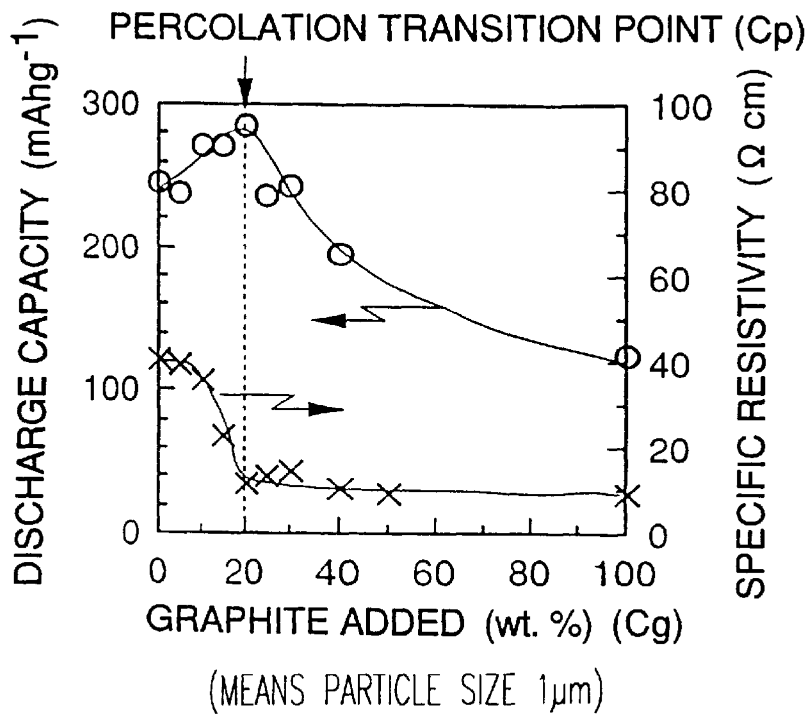
FIG. 5 is a graph showing the relationship between the added amounts of graphite (having a mean particle size of 1 μm) and the discharge capacity of each test cell prepared or the specific resistivity of each tablet prepared in Embodiment 2.

The negative electrode material for lithium secondary batteries in this embodiment comprises a negative electrode active material capable of absorbing and desorbing lithium, and the amount of graphite existing in the negative electrode active material is near to one that may induce percolation transition (see FIG. 5 to be mentioned hereinunder).

In this, therefore, Cg is almost the same as Cp.

The negative electrode material for lithium secondary batteries was prepared herein in the manner mentioned below.

First, raw coke derived from oil or coal was heated in an inert atmosphere at from 500 to 900° C. to obtain heat-treated coke. 80% by weight of this coke was mixed with 20% by weight of graphite having a mean particle size of 1 μm to obtain 100% by weight of a negative electrode active material comprised of the coke and graphite.

The obtained negative electrode active material can absorb and release lithium ions to work as a negative electrode material for lithium secondary batteries.

The details will be referred to in Embodiment 2.

The functions and the advantages of this embodiment are mentioned below.

In the negative electrode material 1 for lithium secondary batteries of this embodiment, the amount of graphite 11 added to the negative electrode active material is near to the amount thereof to reach its percolation transition point (see FIG. 5 to be mentioned hereinunder).

Figure 1A:
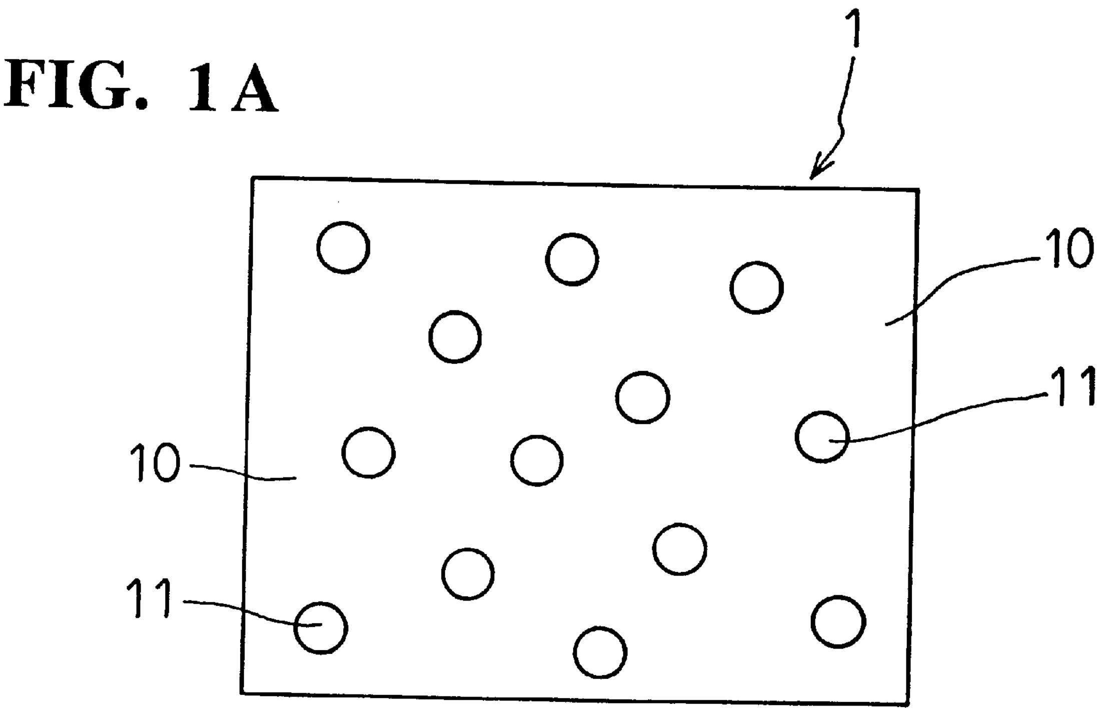
FIG. 1A is a graphical view showing the arrangement of coke and graphite particles in a negative electrode material for lithium secondary batteries, in which Cg is smaller than Cp.

As in FIG. 1A, where the amount of graphite 11 added is smaller than the amount thereof to reach its percolation transition point, the graphite particles 11 are spotwise dispersed in the coke 10 constituting the negative electrode material 1.

Figure 1B:
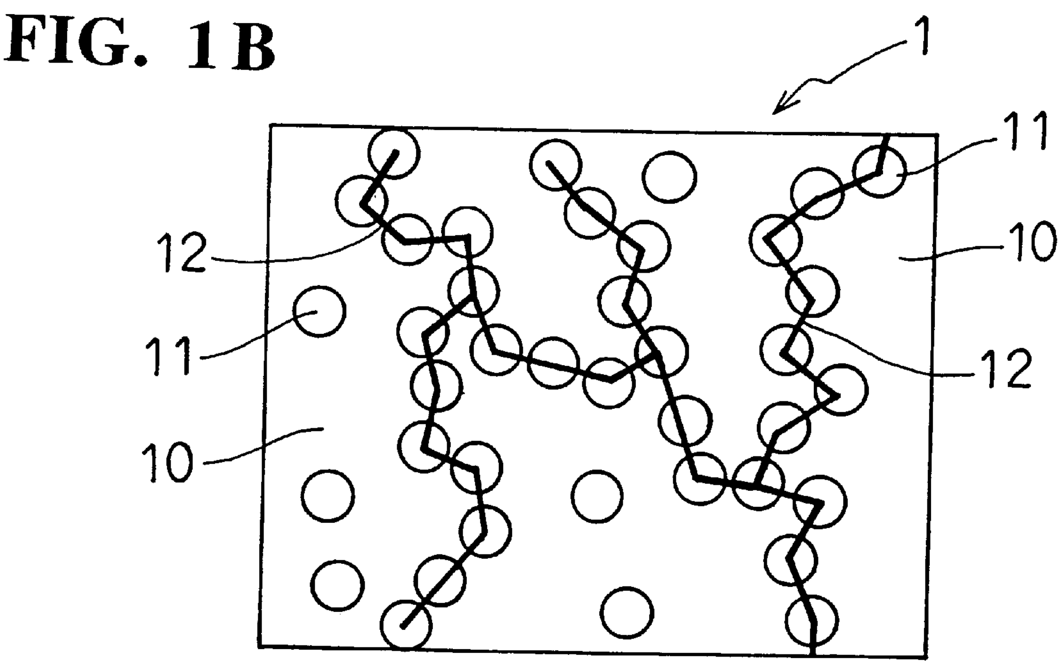
FIG. 1B is a graphical view showing the condition of coke and graphite particles in a negative electrode material for lithium secondary batteries, in which Cg is almost the same as Cp and in which are formed electroconductive paths connecting the graphite particles. For these, referred to is Embodiment 1 to be mentioned hereinunder.

However, where the amount of graphite 11 added is near to the amount thereof to reach its percolation transition point, as in FIG. 1B, electroconductive paths 12 are formed between the graphite particles 11 due to percolation transition of the particles.

In the latter case of FIG. 1B, the graphite particles 11 and the electroconductive paths 12 act as the network for electric conduction in the negative electrode active material, while the discharge capacity of the coke 10 is increased due to the collecting effect of the graphite 11.

Accordingly, when the negative electrode material 1 of this embodiment is used to form negative electrodes and these negative electrodes are used to construct a lithium secondary battery, then the resulting lithium secondary battery has a high discharge capacity.

Since the graphite particles 11 can also absorb lithium ions, the lithium secondary battery comprising the negative electrodes prepared above shall have a much higher discharge capacity than any others comprising negative electrodes made of only coke.

The coke 10 used in this embodiment is heat-treated coke.

Figure 2:
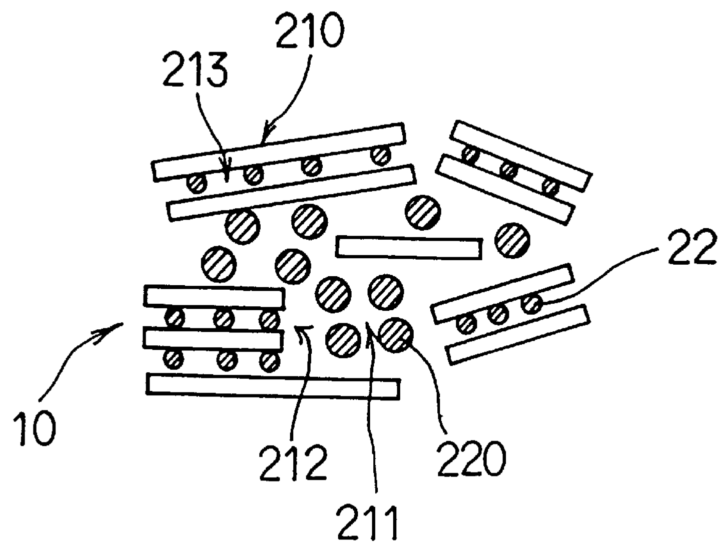
FIG. 2 is a graphical view showing the arrangement of coke in a negative electrode material for lithium secondary batteries, in which lithium ions and lithium clusters have been absorbed by the coke. This view also shows the arrangement of Embodiment 1.

As in FIG. 2, the heat-treated coke 10 comprises enlarged coke crystals 210 that are formed by partially pyrolyzing the coke crystals constituting raw coke.

In the negative electrode material for lithium secondary batteries of this embodiment, lithium ions are absorbed by the heat-treated coke 10 in the manner mentioned below.

Precisely, the coke crystals 210 partly have a layered structure, like graphite, in which lithium ions 22 are directly intercalated into the interlayer 213 in said layered structure. A cavity 211 is formed between one terminal 212 of the coke crystal 210 and one terminal 212 of the other coke crystal 210, and the cavity 211 absorbs lithium clusters 220 composed of lithium ions 22.

Thus, the heat-treated coke can absorb a larger amount of lithium ions, and a lithium secondary battery comprising the negative electrode material that comprises the heat-treated coke can have a higher discharge capacity.

Figure 3:
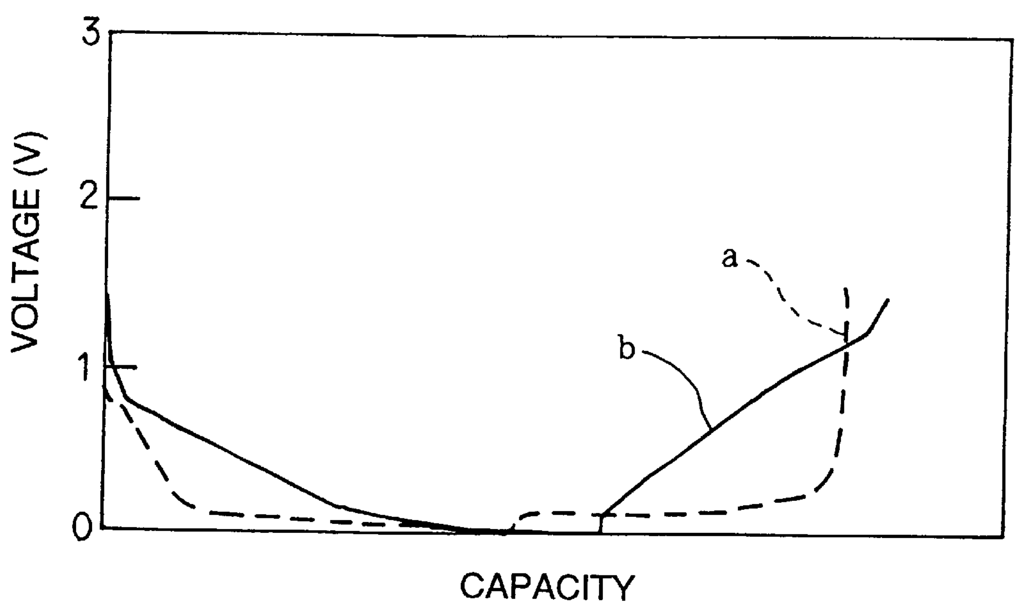
FIG. 3 is a graph showing the relationship between the voltage and the capacity in the test cell a and the test cell b as prepared in Embodiment 1.

Now FIG. 3 is a graph showing the results of the charge/discharge test of two test cells, a and b, as carried out using a constant-current system.

The test cell a has a negative electrode material comprising graphite only. The test cell b has a negative electrode material comprising coke only.

Figure 4:
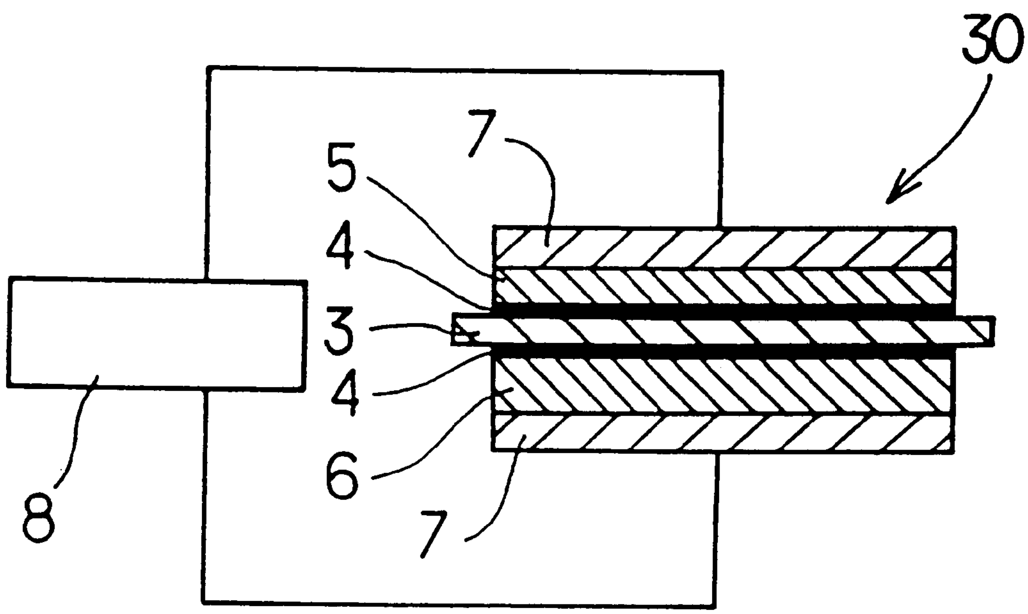
FIG. 4 is a graphical view showing the cross section of the test cell as prepared in Embodiment 2.

The structure of these test cells a and b are the same as that shown in FIG. 4, as in Embodiment 2.

Referring to FIG. 3, it is known that the voltage of the test cell a is not so much varied even though the capacity thereof is varied, while it is known that the voltage of the test cell b is varied with the variation in the capacity thereof.

The above data verify that the voltage of the test cell a is not so much varied during charging and discharging, but that the voltage of the test cell b is varied during charging and discharging.

From these results, it is understood that, when the test cell a is charged under a high current density condition, the cell voltage quickly reaches 0 V as compared with the case of charging it in a low current density condition, and therefore, the capacity of the test cell a is greatly lowered.

On the other hand, for the test cell b, it is known that, since its voltage varies during charging and discharging, its capacity is not so much lowered even when it is charged under a high current density condition.

From the above, it is understood that, since the negative electrode material for lithium secondary batteries of this embodiment comprises graphite and coke and since its voltage varies during charging and discharging and it is delayed for its voltage to reach 0 V, its capacity is lowered only a little even when it is charged in a high density current condition.

Embodiment 2

Various test cells were prepared herein, each comprising the negative electrode material for lithium secondary batteries of the present invention. The characteristics of the test cells are referred to herein, with reference to FIGS. 4 to 7.

The negative electrode material used in preparing the test cells was prepared as follows:

Petroleum heavy oil was pyrolyzed at 500° C. to obtain raw coke. This was ground into particles having a mean particle size of 30 μm to obtain raw coke particulate.

The raw coke particulate was further ground and classified to select coke particles having a mean particle size of 2.7 μm. The resulting coke particulate was heat-treated at 900° C. for 1 hour to obtain heat-treated coke.

Next, graphite particles were added to the heat-treated coke to prepare a negative electrode material for lithium secondary batteries, which comprised coke and graphite.

Figure 6:
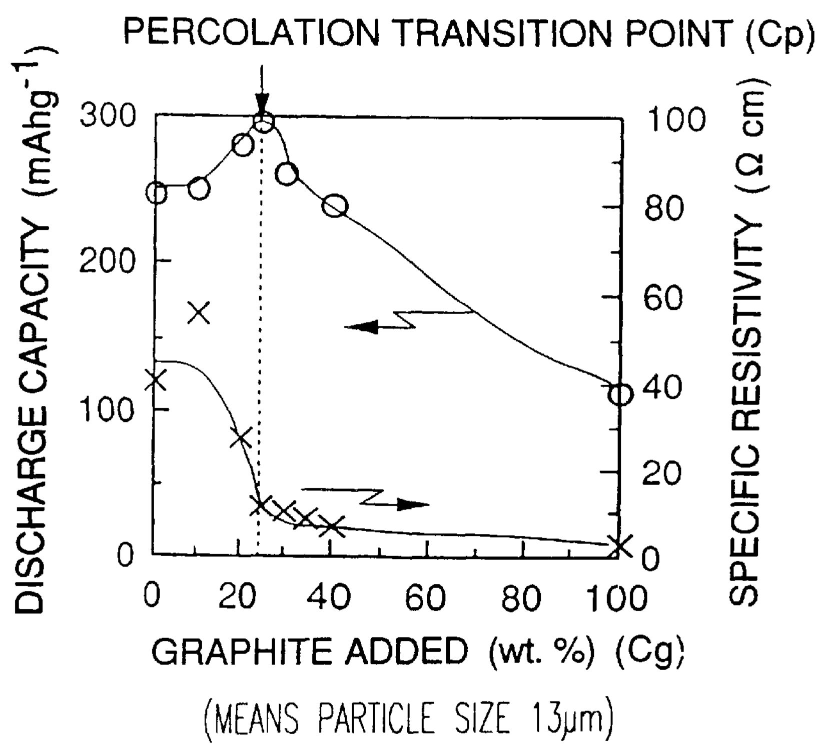
FIG. 6 is a graph showing the relationship between the added amounts of graphite (having a mean particle size of 13 μm) and the discharge capacity of each test cell prepared or the specific resistivity of each tablet prepared in Embodiment 2.
Figure 7:
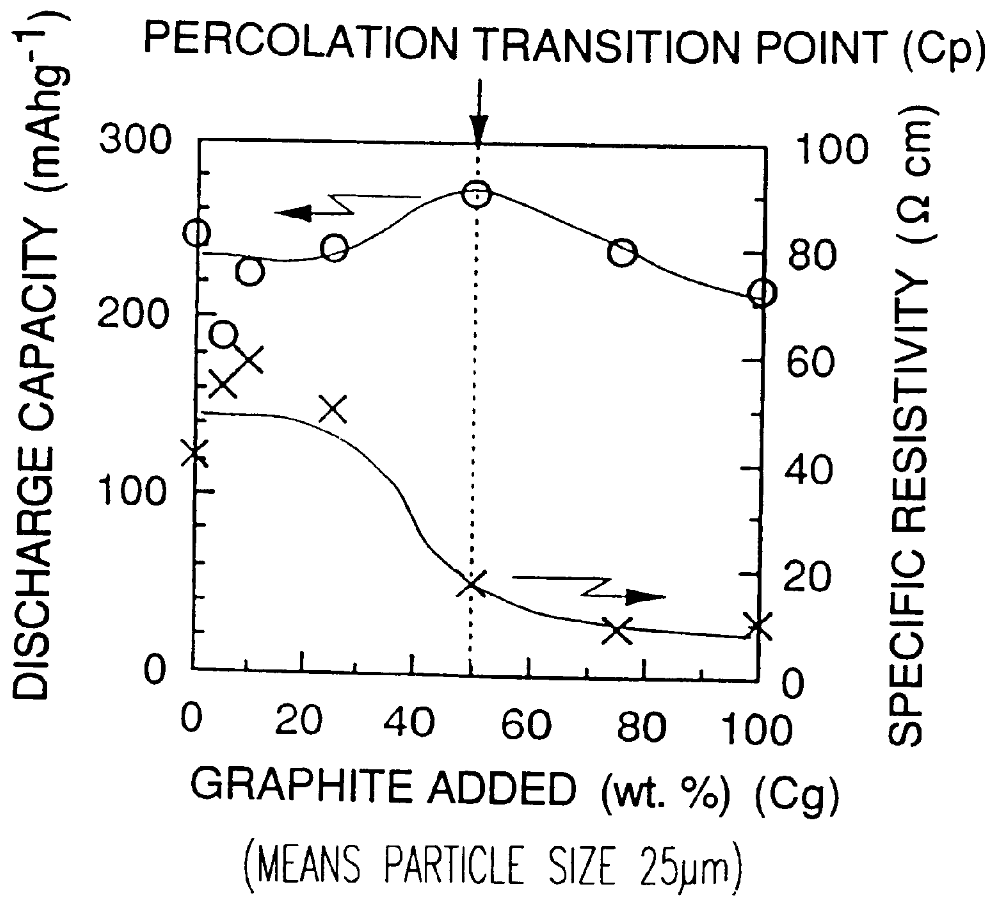
FIG. 7 is a graph showing the relationship between the added amounts of graphite (having a mean particle size of 25 μm) and the discharge capacity of each test cell prepared or the specific resistivity of each tablet prepared in Embodiment 2.

In this, the amount of the graphite to be added was varied to be from 0% by weight to 100% by weight, as in FIG. 5 to FIG. 7. Three types of graphite particles were used herein, having a mean particle size of 1, 13 and 25 μm, respectively.

As a result of the above-mentioned process, obtained were various negative electrode materials for lithium secondary batteries, in which the mean particle size of the graphite particles added and the amount thereof added were varied in the manner as above.

The structure of the test cells prepared herein is as follows:

As in FIG. 4, the test cell 30 comprises a separator 3 in the center thereof, a pair of electrolytic solutions 4 as disposed to sandwich the separator 3 therebetween, a carbon electrode 6 and a counter electrode 5 thereto as disposed around the electrolytic solutions 4, and a pair of collectors 7 as disposed around the electrodes 5 and 6. The collectors 7 existing at the both sides are connected to a charge/discharge device 8.

The counter electrode 5 in the test cell 30 was made of a lithium metal tablet having a diameter of 15 mm and a thickness of 0.8 mm.

The carbon electrode 6 comprised a different negative electrode material for lithium secondary batteries as prepared in the manner mentioned hereinabove, and was prepared as follow:

First, the negative electrode material for lithium secondary batteries was mixed with 4% by weight of a binder, tetrafluoroethylene, to be 100% by weight. 20 mg of the resulting mixture was weighed.

Next, this mixture was, along with a collector, SUS mesh, shaped into a tablet having a diameter of 15 mm. This tablet was used as the carbon electrode 6 in the test cell 30.

The separator 3 as disposed between the carbon electrode 6 and the counter electrode 5 thereto was made of a porous polyethylene, and had a diameter of 20 mm and a thickness of 75 μm.

The electrolytic solution 4 in the test cell 30 was prepared by dissolving $LiPF_6$ in a mixed solution of ethylene carbonate/diethyl carbonate (EC/DEC) (1/1, by volume) in an amount of 1 mol/liter.

Each test cell 30 was subjected to a charge/discharge test, in which the discharge capacity of the test cell 30 was measured.

Precisely, the test cell 30 was first charged to 0 V in a constant current condition at 0.5 mA/cm$^2$. The discharging of the test cell 30 thus charged was carried out at 1 mA/cm$^2$ and terminated at the point when the electrode potential reached 1.5 V.

In this test, the discharge capacity of the test cell 30 was obtained from the quantity of electricity that passed through the cell during discharging it to vary its electrode potential from 0 V to 1.5 V.

Apart from the test for the test cells, various tablets were prepared each comprising the same negative electrode material as that used in preparing the carbon electrode 6 in each test cell 30, and the specific resistivity of each tablet was measured.

The tablets were prepared as follows: Each negative electrode material was mixed with 4% by weight of tetrafluoroethylene to be 100% by weight. About 50 mg of the resulting mixture was weighed, and shaped into a tablet having a diameter of 10 mm and a thickness of about 0.5 mm.

The data obtained in these tests are shown in FIG. 5 to FIG. 7.

FIG. 5 shows the results of the specific resistivity value of each carbon electrode made from the negative electrode material to which were added graphite particles having a mean particle size of 1 μm, and the discharge capacity of each test cell. FIG. 6 shows the same results as in FIG. 5, in which, however, graphite particles having a mean particle size of 13 μm were added; and FIG. 7 shows the same results as in FIG. 5, in which added were graphite particles having a mean particle size of 25 μm.

As in FIG. 5 to FIG. 7, the amount of graphite having a mean particle size of 1 μm, 13 μm and 25 μm as added to reach its percolation transition point, Cp, was about 20% by weight, about 25% by weight, and about 50% by weight, respectively.

In every case, the discharge capacity of the cells was the highest when the amount of graphite added, Cg, was near to Cp.

Comparing the discharge capacity of each test cell with that of the control test cell in which the amount of graphite added, Cg, was 0% by weight, or that is, the negative electrode active material was made of only coke, the discharge capacity of the former was observed to increase when the amount of graphite added, Cg, was near to one that satisfies $(Cp-10) \leqq Cg \leqq (Cp+10)$.

In this embodiment, the test for charging and discharging each test cell was conducted in a high current density condition at 0.5 mA/cm$^2$, from which, therefore, it was found that the discharge capacity of the test cells comprising a larger amount of graphite added thereto was lowered due to voltage drop.

Embodiment 3

Negative electrode active materials of samples 1 to 19 prepared herein are referred to, with reference to FIG. 4, Table 1 and Table 2.

Samples 1 to 19 were prepared as follows:

Petroleum heavy oil was pyrolyzed at 500° C. to prepare raw coke. This raw coke was ground into particles having a mean particle size of 30 μm to prepare raw coke particulate.

This raw coke particulate was put onto an alumina boat, and heated in an electric furnace, while introducing argon thereinto at a flow rate of 1 liter/min. The heating rate was 20° C./min, and each sample was heated up to a highest temperature of 900° C. (samples 1 to 8; see Table 1) or 650° C. (samples 9 to 19; see Table 2). The retention time in the furnace was 1 hour. Thus were prepared two types of heat-treated coke.

After each heat-treated coke was cooled, ground in a mortar and classified through a mesh to collect coke particles of 30 μm or smaller in size, the coke particles were mixed with graphite to prepare various negative electrode active materials. These are referred to as samples 1 to 19.

The graphite employed to prepare samples 1 to 8 had a specific surface area of 200 $m^2$/g. The graphite employed to prepare samples 9 to 19 had a specific surface area of 1.7 $m^2$/g.

Next, these samples 1 to 19 were used to prepare various negative electrodes for lithium secondary batteries. Using these negative electrodes as carbon electrodes, test cells were constructed. The charge/discharge capacity of each test cell was measured, on the basis of which the test cell was evaluated.

As in FIG. 4, the test cell 30 comprised a separator 3 in the center thereof, a pair of electrolytic solutions 4 as disposed to sandwich the separator 3 therebetween, a carbon electrode 6 and a counter electrode 5 thereto as disposed around the electrolytic solutions 4, and a pair of collectors 7 as disposed around the electrodes 5 and 6. The collectors 7 existing at the both sides were connected to a charge/discharge device 8.

The counter electrode 5 in the test cell 30 was made of a lithium metal tablet having a diameter of 15 mm and a thickness of 0.8 mm.

The carbon electrode 6 was made of a tablet that had been prepared by shaping 20 mg of a mixture comprised of 96% by weight of any of the negative electrode active materials, samples 1 to 19, and 4% by weight of a binder, polytetrafluoroethylene, along with SUS mesh to be the collector 7 into a tablet having a diameter of 15 mm.

The separator 3 as disposed between the carbon electrode 6 and the counter electrode 5 thereto was made of a porous polyethylene, and had a diameter of 20 mm and a thickness of 75 μm.

The electrolytic solution 4 in the test cell 30 was prepared by dissolving $LiPF_6$ in a mixed solution of ethylene carbonate/diethyl carbonate (EC/DEC) (1/1, by volume) in an amount of 1 mol/liter.

Each test cell 30 was subjected to a charge/discharge test, in which the charge/discharge capacity of the test cell 30 was measured.

Precisely, the test cell 30 was first charged to 0 V in a constant current condition at 0.5 mA/$cm^2$. The discharging of the test cell 30 thus charged was carried out at 1 mA/$cm^2$ and terminated at the point when the electrode potential reached over 1.5 V.

In this test, the charge capacity of the test cell tested was obtained from the quantity of electricity that passed through the cell during charging it to vary the potential of the carbon electrode 6 from about 3 V to 0 V, and the discharge capacity thereof was obtained from the quantity of electricity that passed therethrough during discharging it to vary its electrode potential from 0 V to 1.5 V.

On the other hand, polytetrafluoroethylene was mixed with 50 mg of each of these samples 1 to 19 in an amount of 4% by weight, and the resulting mixtures each were shaped into tablets having a diameter of 10 mm and a thickness of about 0.5 mm. The electroconductivity of each tablet was obtained by measuring the resistance between the both ends of the tablet.

The data thus obtained herein are shown in Table 1 and Table 2.

TABLE 1

| Sample No. | Coke/Graphite (weight ratio) | Charge Capacity ($mAhg^{-1}$) | Discharge Capacity ($mAhg^{-1}$) (0–1.5V) | Electro-conductivity ($Scm^{-1}$) |
|---|---|---|---|---|
| 1 | 90/10 | 473 | 273↑ | $2.78 \times 10^{-2}$ |
| 2 | 85/15 | 496 | 282↑ | $4.53 \times 10^{-2}$ |
| 3 | 80/20 | 542 | 286↑ | $8.33 \times 10^{-2}$ |
| 4 | 97/3 | 451 | 268↑ | $2.53 \times 10^{-2}$ |
| 5 | 63/37 | 573 | 255↑ | $8.83 \times 10^{-2}$ |
| 6 | 100/0 | 345 | 247 | $2.0 \times 10^{-2}$ |
| 7 | 60/40 | 600 | 196↓ | $9.09 \times 10^{-2}$ |
| 8 | 0/100 | 688 | 127 | $1.02 \times 10^{-1}$ |

TABLE 2

| Sample No. | Coke/Graphite (weight ratio) | Charge Capacity ($mAhg^{-1}$) | Discharge Capacity ($mAhg^{-1}$) (0–1.5V) | Electro-conductivity ($Scm^{-1}$) |
|---|---|---|---|---|
| 9 | 95/5 | 542 | 311↑ | $1.03 \times 10^{-4}$ |
| 10 | 90/10 | 562 | 331↑ | $2.35 \times 10^{-3}$ |
| 11 | 80/20 | 625 | 348↑ | $5.33 \times 10^{-2}$ |
| 12 | 75/25 | 552 | 317↑ | $8.65 \times 10^{-2}$ |
| 13 | 97/3 | 528 | 303↑ | $9.33 \times 10^{-5}$ |
| 14 | 63/37 | 518 | 314↑ | $9.98 \times 10^{-2}$ |
| 15 | 100/0 | 449 | 224 | $3.04 \times 10^{-5}$ |
| 16 | 60/40 | 505 | 310↑ | $1.01 \times 10^{-1}$ |
| 17 | 50/50 | 475 | 309 | $2.34 \times 10^{-1}$ |
| 18 | 25/75 | 480 | 279 | $3.43 \times 10^{-1}$ |
| 19 | 0/100 | 333 | 219 | $5.09 \times 10^{-1}$ |

As is known from Table 1 and Table 2, it is understood that the negative electrode active material of the present invention having a graphite content of from 2 to 40% by weight (samples 1 to 5, sample 7, samples 9 to 14, and sample 16) has a higher electroconductivity than the negative electrode active material of 100% coke, and that when formed into a negative electrode, the former can be charged at a lower voltage, while absorbing larger amounts of lithium ions 22 and lithium clusters 220, than the latter.

In addition, it is also understood therefrom that the amount of lithium ions capable of being absorbed by the negative electrode comprising a negative electrode active material of only coke, such as sample 6 and sample 15, is smaller than that capable of being absorbed by the negative electrode of the invention.

Moreover, it is also understood that the negative electrode comprising a negative electrode active material of graphite only, such as sample 8 and sample 19, as well as the negative electrode comprising a negative electrode active material that has a graphite content of larger than 40% by weight, such as sample 17 and sample 18, is inferior to the negative electrode of the invention in that the charge/discharge capacity of the former is lower than that of the latter.

The above data verify that the lithium secondary batteries comprising negative electrodes that comprise the negative electrode active material of the present invention have a large charge/discharge capacity.

While the invention has been described in detail and with reference to specific embodiments thereof, it will be apparent to one skilled in the art that various changes and modifications can be made therein without departing from the spirit and scope thereof.

What is claimed is:

1. A negative electrode material for lithium secondary batteries, comprising:

coke; and graphite forming a mixture with said coke, an amount of said graphite (Cg) being near to an amount which induces percolation transition (Cp), wherein the Cg is from 2 to 25% by weight.

2. The negative electrode material for lithium secondary batteries as claimed in claim 1, wherein the atomic ratio of hydrogen to carbon in said coke is 0.06 or more.

3. The negative electrode material for lithium secondary batteries as claimed in claim 1, wherein the atomic ratio of hydrogen to carbon in said coke is 0.1 or more.

4. The negative electrode material for lithium secondary batteries as claimed in claim 1, wherein the atomic ratio of oxygen to carbon in said coke is 0.003 or more.

5. The negative electrode material for lithium secondary batteries as claimed in claim 1, wherein said coke has an electroconductivity of from $10^{-7}$ to $10^{-2}$ S/cm.

6. The negative electrode material for lithium secondary batteries as claimed in claim 1, wherein said coke is prepared by heating raw coke from oil or coal at a temperature of from 500° C. to 900° C.

7. The negative electrode material for lithium secondary batteries as claimed in claim 6, wherein said heat treatment is conducted in an inert atmosphere.

8. The negative electrode material for lithium secondary batteries as claimed in claim 1, wherein said coke is prepared by heating raw coke from oil or coal at a temperature of from 500° C. to 850° C.

9. The negative electrode material for lithium secondary batteries as claimed in claim 8, wherein said heat treatment is conducted in an inert atmosphere.

10. A negative electrode material for lithium secondary batteries comprising:

coke; and graphite forming a mixture with said coke, an amount of said graphite (Cg) being near to an amount which induces percolation transition (Cp), wherein the Cg is from 2 to 27% by weight, and said graphite has a mean particle size of from 1 μm to 20 μm.

* * * * *

UNITED STATES PATENT AND TRADEMARK OFFICE

CERTIFICATE OF CORRECTION

PATENT NO. : 5,958,622

DATED : September 28, 1999

INVENTOR(S): Yoshitsugu KOJIMA, et al.

It is certified that an error appears in the above-identified patent and that said Letters Patent is hereby corrected as shown below:

Column 14, line 23, "2 to 27%" should read --2 to 37%--.

Signed and Sealed this

Twenty-third Day of May, 2000

Attest:

Q. TODD DICKINSON

*Attesting Officer* *Director of Patents and Trademarks*